United States Patent
Lee et al.

(10) Patent No.: US 7,747,092 B2
(45) Date of Patent: Jun. 29, 2010

(54) IMAGE ENCODING APPARATUS AND METHOD, AND IMAGE DECODING APPARATUS AND METHOD

(75) Inventors: Sangjo Lee, Suwon-si (KR); Shihwa Lee, Seoul (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1000 days.

(21) Appl. No.: 11/498,045

(22) Filed: Aug. 3, 2006

(65) Prior Publication Data

US 2007/0031051 A1    Feb. 8, 2007

(30) Foreign Application Priority Data

Aug. 3, 2005    (KR) .................. 10-2005-0070969

(51) Int. Cl.
*G06K 9/36*    (2006.01)
*G06K 9/46*    (2006.01)

(52) U.S. Cl. .............. 382/234; 382/233; 382/248
(58) Field of Classification Search ............... 382/176, 382/232, 233, 234, 237, 244, 248, 251
See application file for complete search history.

(56) References Cited

U.S. PATENT DOCUMENTS 4,745,473 A * 5/1988 Hall .................. 348/396.1
7,003,171 B1 * 2/2006 Takeo ................. 382/251

* cited by examiner

*Primary Examiner*—Phuoc Tran
(74) *Attorney, Agent, or Firm*—Staas & Halsey LLP

(57) ABSTRACT

An image encoding apparatus and method, and an image decoding apparatus and method. An image encoding apparatus includes: an image input unit receiving an image to be encoded; a transform encoding unit transform coding the image provided from the image input unit to generate a first bitstream; a pulse code modulation (PCM) encoding unit PCM coding the image provided from the image input unit to generate a second bitstream; and a selector selecting and outputting one of the first bitstream and the second bitstream depending on characteristics of the image.

36 Claims, 8 Drawing Sheets

IMAGE ENCODING APPARATUS AND METHOD, AND IMAGE DECODING APPARATUS AND METHOD

CROSS-REFERENCE TO RELATED APPLICATION

This application claims the benefit of Korean Patent Application No. 10-2005-0070969, filed on Aug. 3, 2005, in the Korean Intellectual Property Office, the disclosure of which is incorporated herein by reference.

BACKGROUND OF THE INVENTION

1. Field of the Invention

The present invention relates to image encoding and decoding, and more particularly, to apparatuses and methods for encoding and decoding a binary image having a pixel value of two kinds or less, or a text image including a boundary portion.

2. Description of Related Art

Multimedia apparatuses such as mobile phones and personal digital assistants (PDAs) having a video graphic array (VGA) resolution of 640×480 or 480×460 read image data in units of lines, generate one-dimensional (1-D) blocks having a predetermined number of pixels for each line, and perform coding in units of 1-D blocks to generate a bitstream. The 1-D block may consist of 8×1 pixels or 4×1 pixels. However, when an original image as illustrated in FIG. 1A is coded in units of 1-D blocks, the image quality of a binary image 111 or a text image 113 including a boundary as illustrated in FIG. 1B may be seriously reduced. Also, when an original image having a definite boundary portion 131 as illustrated in FIG. 1C is coded with a fixed compression ratio, bits to be assigned are short for a lower portion 133 of one frame, which not only reduces image quality but also reduces an encoding efficiency, so that a desired compression ratio is not achieved.

BRIEF SUMMARY

The present invention provides an image encoding apparatus and method for generating a bitstream using one of transform coding and pulse code modulation (PCM) of an inputted image depending on whether the inputted image is a binary image having a pixel value of two kinds or less, or a text image including a boundary portion.

The present invention also provides an image decoding apparatus and method for decoding a bitstream generated using one of transform coding and pulse code modulation (PCM) of an inputted image.

According to an aspect of the present invention, there is provided an image encoding apparatus including: an image input unit inputting an image to be encoded; a transform encoding unit performing transform coding on the image provided from the image input unit to generate a first bitstream; a pulse code modulation (PCM) encoding unit performing PCM coding on the image provided from the image input unit to generate a second bitstream; and a selector selecting and outputting one of the first bitstream and the second bitstream depending on the characteristic of the image.

According to another aspect of the present invention, there is provided an image encoding method including: performing transform coding on an image to be encoded so as to generate a first bitstream; performing a PCM coding on the image to be encoded so as to generate a second bitstream; and selecting and outputting one of the first bitstream and the second bitstream depending on the characteristics of the image.

According to another aspect of the present invention, there is provided an image decoding apparatus including: a bitstream analyzing unit analyzing a bitstream generated by transform coding or pulse code modulation (PCM) coding depending on characteristics of an image to be decoded to determine whether the bitstream has been transform coded or PCM coded; a transform decoding unit transform-decoding the bitstream when the bitstream is generated by the transform coding; and a PCM decoding unit PCM-decoding the bitstream when the bitstream is generated by the PCM coding.

According to another aspect of the present invention, there is provided an image decoding method including: analyzing a bitstream generated by transform coding or pulse code modulation (PCM) coding depending on characteristics of an image to be decoded to determine whether the bitstream has been transform coded or PCM coded; transform-decoding the bitstream when the bitstream is generated by the transform coding; and PCM-decoding the bitstream when the bitstream is generated by the PCM coding.

The methods for encoding and decoding an image may be realized in the form of computer codes stored in computer-readable recording media.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
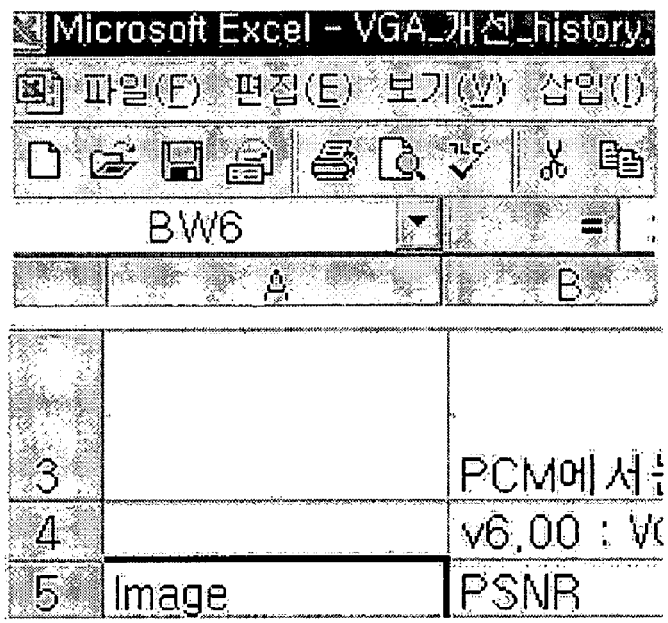
FIGS. 1A to 1C are views illustrating image quality deterioration during compression of a text image containing a binary image or a boundary portion according to the conventional art.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
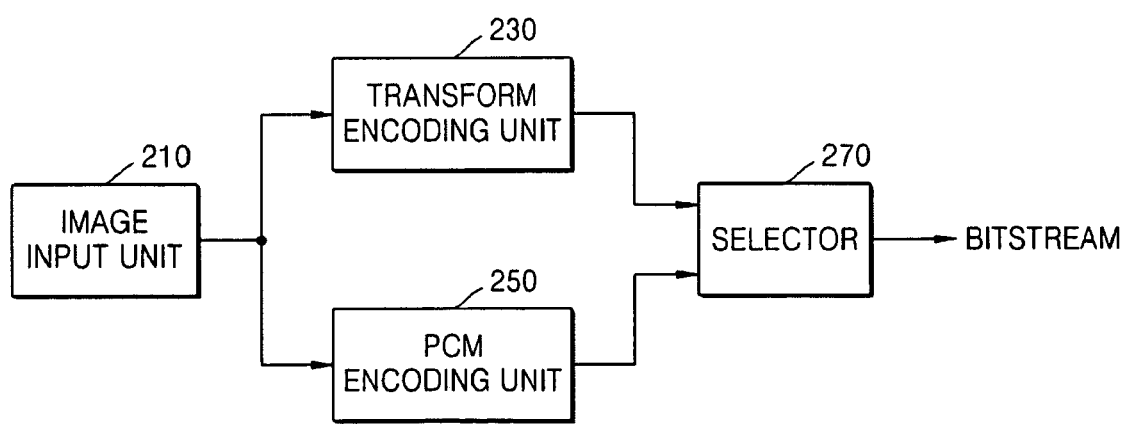
FIG. 2 is a block diagram of an image encoding apparatus according to an embodiment of the present invention.

FIG. 2 is a block diagram of an image encoding apparatus according to an embodiment of the present invention. The image encoding apparatus includes an image input unit 210, a transform encoding unit 230, a PCM encoding unit 250, and a selector 270.

Referring to FIG. 2, the image input unit 210 receives an image to code in units of lines, forms 1-D blocks having a predetermined number of pixels with respect to each line, and provides the image in units of 1-D blocks to the transform encoding unit 230 and to the PCM encoding unit 250. Here, the 1-D block may consist of, by way of non-limiting examples, 8×1 pixels or 4×1 pixels.

The transform encoding unit 230 performs transform coding on the image provided in units of 1-D blocks from the image input unit 210 to generate a bitstream. The transform encoding unit 230 may perform an estimation process, a transform process, a quantization process, and an entropy encoding process.

The PCM encoding unit 250 performs PCM coding on the image provided in units of 1-D blocks from the image input unit 210 to generate a bitstream.

The selector 270 selects either a result from the transform encoding unit 230 or a result from the PCM encoding unit 250 as a coding result of the 1-D blocks and outputs a bitstream generated as a result of the selected coding result. When the bitstream outputted from the PCM encoding unit 250 is generated as a result of the coding of a binary image or a text image, the selector 270 selects the result from the PCM encoding unit 250. Also, even when the bitstream outputted from the PCM encoding unit 250 is not generated as a result of the coding of a binary image or a text image, the selector 270 selects the result from the PCM encoding unit 250 when a data amount of the bitstream from the transform encoding unit 230 is greater than a first threshold value.

Figure 3:
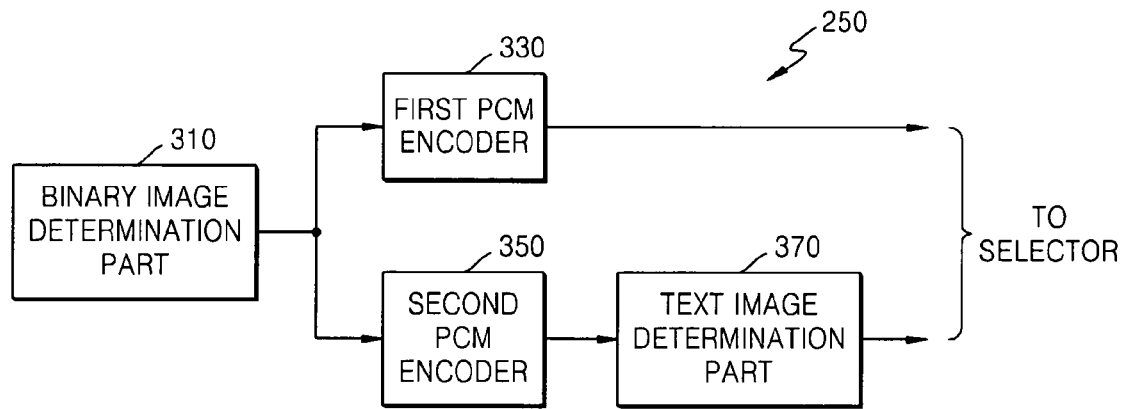
FIG. 3 is a block diagram illustrating details of a PCM encoding unit of FIG. 2, according to an embodiment of the present invention.

FIG. 3 is a block diagram illustrating in detail the PCM encoding unit 250 of FIG. 2. The PCM encoding unit 250 includes a binary image determination part 310, a first PCM encoder 330, a second PCM encoder 350, and a text image determination part 370.

Referring to FIG. 3, the binary image determination part 310 determines whether an inputted image, e.g., pixels contained in a 1-D block, has two or fewer different pixel values and provides the 1-D block to the first PCM encoder 330 or to the second PCM encoder 350 depending on the determination result. That is, when the pixels contained in the 1-D block have two or fewer different values, the binary image determination part 310 provides the 1-D block to the first PCM encoder 330, otherwise, provides the 1-D block to the second PCM encoder 350.

The first PCM encoder 330 performs binary PCM coding on the 1-D block from the binary image determination part 310 to generate a bitstream containing a PCM flag indicating that the binary PCM coding has been performed, a PCM coding value of the same pixel value or of two different values, and a pixel value pattern represented by a binary value.

The second PCM encoder 350 performs normal PCM coding on a value of each pixel contained in the 1-D block from the binary image determination part 310 to generate a bitstream. At this point, the value of each pixel contained in the 1-D block is bit-shifted, so that the range of the pixel value is reduced and then PCM coding may be performed on each pixel.

The text image determination part 370 analyzes a bitstream of the 1-D block from the second PCM encoder 350 to determine whether the 1-D block is a text image, adds a flag to the bitstream of the 1-D block depending on a determination result, and outputs the same. At this point, when the 1-D block has one or more boundary portions and a similar pixel value or the same pixel value is repeated, the text image determination part 370 determines the 1-D block is a text image. That is, when the 1-D block has a boundary portion where a difference between adjacent pixel values is at least a second threshold value and has a portion of at least a fourth threshold value of pixels where a difference between adjacent pixel values is no more than a third threshold value, the text image determination part 370 determines that the 1-D block is a text image.

Figure 4:
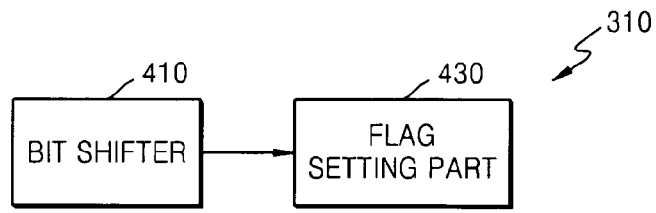
FIG. 4 is a block diagram illustrating details of a binary image determination part of FIG. 3, according to an embodiment of the present invention.

FIG. 4 is a block diagram illustrating details of the binary image determination part 310. The binary image determination part includes a bit shifter 410 and a flag setting part 430.

Referring to FIG. 4, the bit shifter 410 bit-shifts an inputted image, e.g., values of pixels contained in a 1-D block, to reduce the range of the pixel values. For example, when pixels have 256 gray scales, that is, pixels consist of 8 bits, it is possible to reduce the gray scales to 128 gray scales or 64 gray scales by performing 1 bit-shifting or 2 bit-shifting on the pixel values, respectively. Here, the bit shifter 410 does not need to be necessarily provided, but may be optionally provided depending on the gray scale range of the pixels.

The flag setting part 430 checks values of pixels contained in a 1-D block from the bit shifter 410 or the image input unit 210 of FIG. 2 and sets at least one flag depending on whether the 1-D block is a binary image as a result of the checking. First, a case where one flag is set by the flag setting part 430 will be described. For example, the flag setting part 430 assigns '1' when values of pixels contained in a 1-D block have a value of one kind or values of two kinds, and assigns '0' otherwise. Particularly, when the values of pixels contained in the 1-D block have values of two kinds, the flag setting part 430 compares a difference between the two kind pixel values with a fifth threshold value and may assign '1' only when the difference between the two kind pixel values is greater than the fifth threshold value.

Figure 5A:
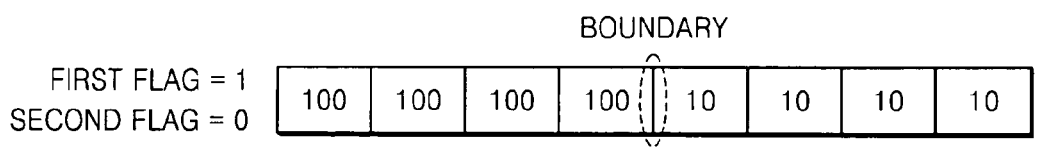
FIGS. 5A and 5B are views illustrating examples of a first flag and a second flag set by a flag setting part illustrated in FIG. 4.
Figure 5B:
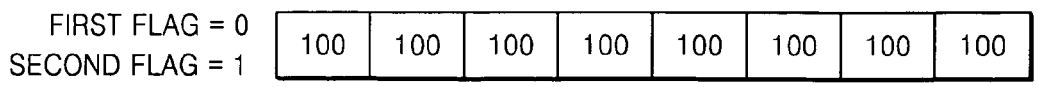

A case where a first flag and a second flag are set by the flag setting part 430 will be described. The flag setting part 430 assigns '1' when values of pixels contained in a 1-D block have two different values and assigns '0' otherwise. Particularly, when the values of the pixels contained in the 1-D block have two different values, the flag setting part 430 compares a difference between the two different pixel values with a fifth threshold value and may assign '1' for a first flag only when the difference between the two different pixel values is greater than the fifth threshold value. The flag setting part 430 assigns '1' when the values of the pixels contained in the 1-D block are the same, and assigns '0' otherwise for a second flag. Particularly, when the values of the pixels contained in the 1-D block provided from the bit shifter 410 are the same, the flag setting part 430 checks values of pixels contained in a 1-D block before the bit-shifting and may assign '1' for the second flag when all of the pixel values contained in the 1-D block before the bit-shifting are the same. The binary values assigned when the flag is set may be opposite to each other. For example, since the 1-D block of FIG. 5A has two different pixel values that include '100' and '10', '1' is assigned to the first flag and '0' is assigned to the second flag. However, since the 1-D block of FIG. 5B has pixels with only the same pixel value '100', '0' is assigned for the first flag and '1' is assigned to the second flag.

Figure 6A:
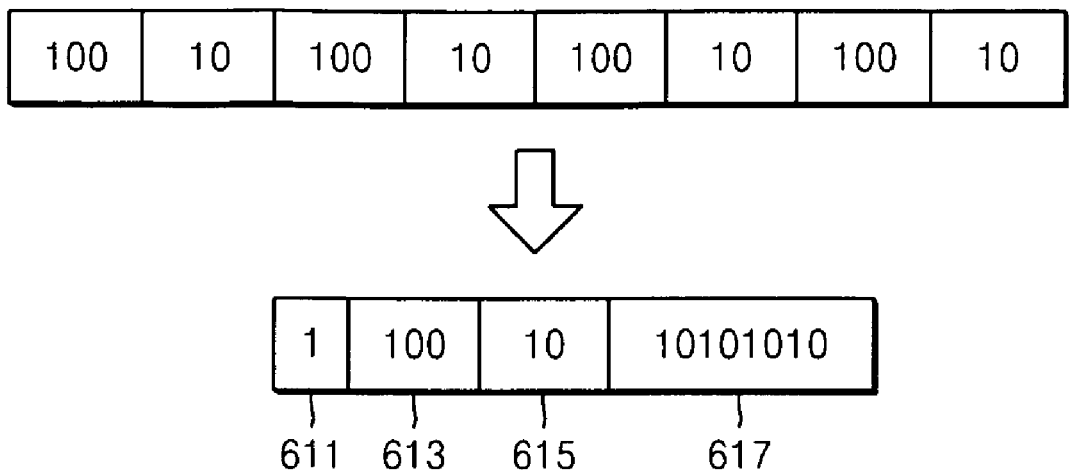
FIGS. 6A and 6B are views explaining an encoding method used by a first PCM encoder of FIG. 3 when the binary image determination part sets one flag to a 1-D block, according to an embodiment of the present invention.
Figure 6B:
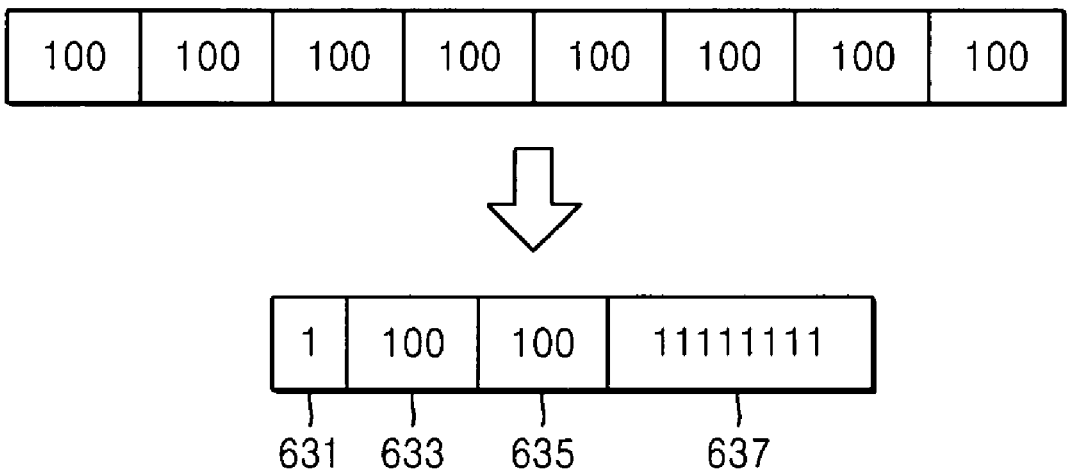

FIGS. 6A and 6B are views for explaining an encoding method used in the first PCM encoder 330 of FIG. 3 when the binary image determination part 310 of FIG. 3 sets one flag to a 1-D block. A bitstream generated as a result of coding by the first PCM encoder 330 consists of first through fourth fields. Here, a PCM flag indicating that the binary PCM coding has been performed is assigned to the first field, PCM coding values of two different pixel values contained in a 1-D block are assigned to the second and third fields, and a pixel value pattern of the 1-D block is assigned to the fourth field. When the 1-D block has two kind pixel values of '100' and '10', a bitstream consisting of first through fourth fields 611, 613, 615, and 617 is generated as illustrated in FIG. 6A. When the 1-D block has pixels with only the same pixel value '100', a bitstream consisting of first through fourth fields 631, 633, 635, and 637 is generated as illustrated in FIG. 6B.

Figure 7A:
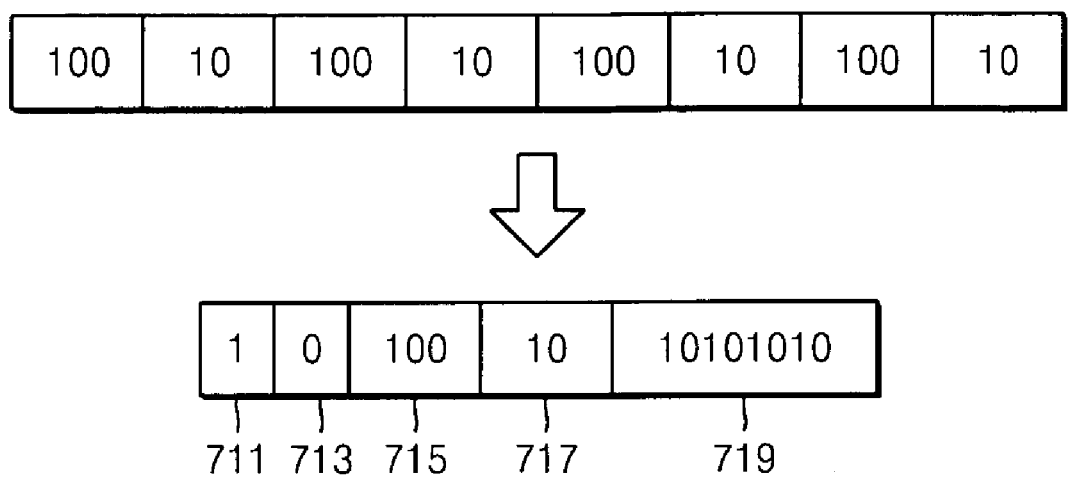
FIGS. 7A and 7B are views illustrating an encoding method used by the first PCM encoder of FIG. 3 when the binary image determination sets the first and second flags to a 1-D block, according to another embodiment of the present invention.
Figure 7B:
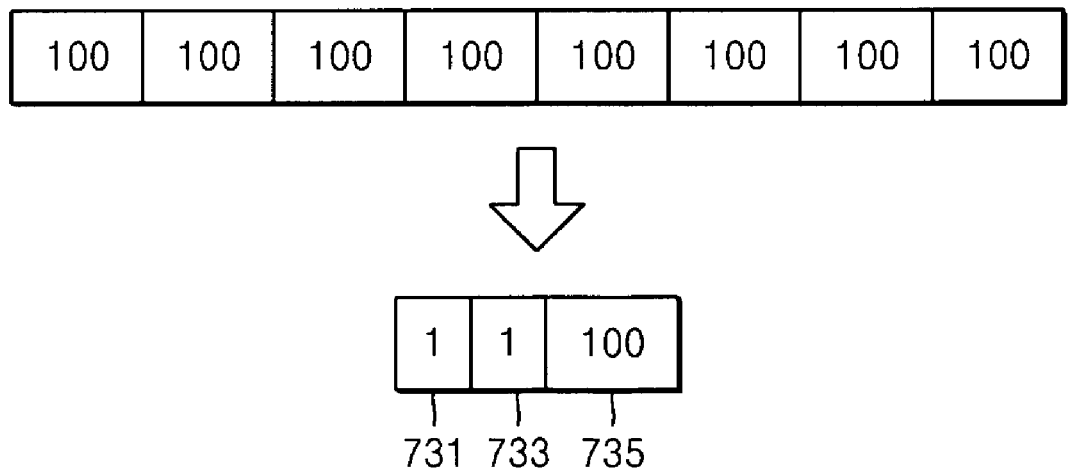

FIGS. 7A and 7B are views for illustrating an encoding method used in the first PCM encoder 330 of FIG. 3 when the binary image determination 310 of FIG. 3 sets the first and second flags to a 1-D block. When the first flag is '1', a bitstream generated as a result of binary PCM coding consists of first through fifth fields. When the second flag is '1', a bitstream generated as a result of coding by the first PCM encoder consists of first through third fields. Here, a PCM flag indicating that the binary PCM coding has been performed is assigned to the first field, a value of the second flag is assigned to the second field, a PCM coding value for the same pixel value or two different pixel values contained in a 1-D block is assigned to third and fourth fields, and a pixel value pattern of a 1-D block is assigned to a fifth field. When a 1-D block has two different pixel values of '100' and '10', a bitstream consisting of first through fifth fields 711, 713, 715, 717, and 719 is generated as illustrated in FIG. 7A. When a 1-D block has pixels with only the same pixel value '100', a bitstream consisting of first through third fields 731, 733, and 735 is generated as in FIG. 7B. As described above, since a pixel value pattern does not need to be separately added when the second flag is '1' a bitstream is simpler.

Figure 8:
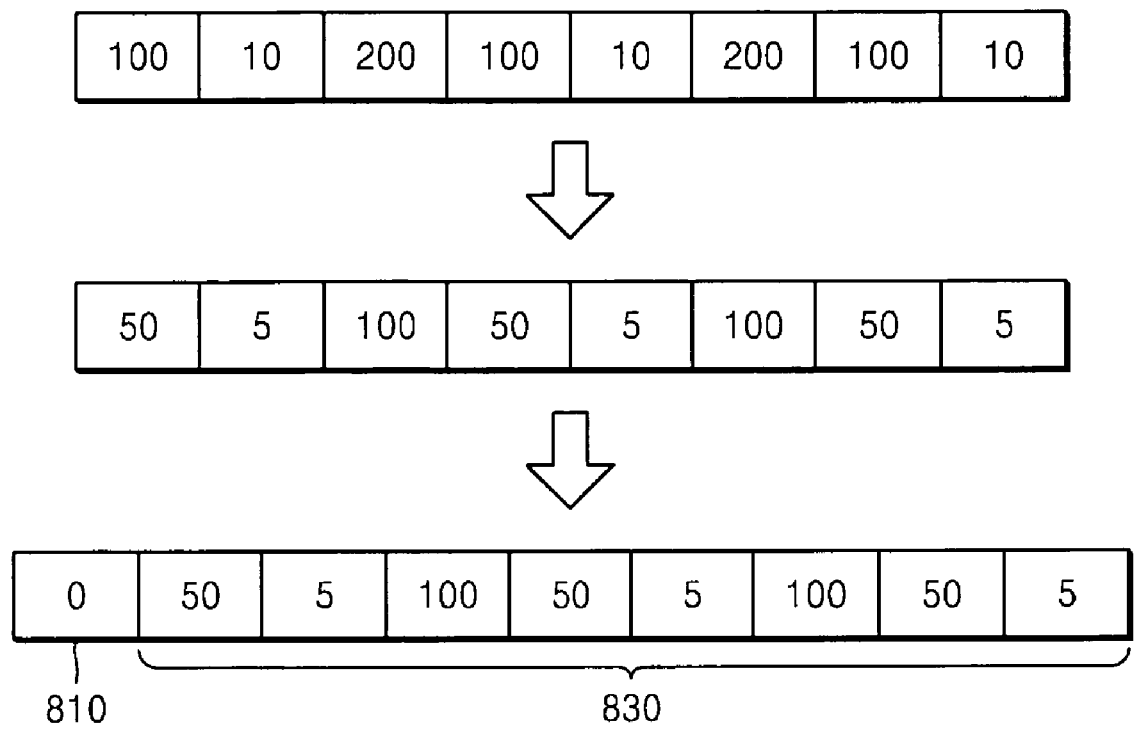
FIG. 8 is a view for explaining operations of a second PCM encoder of FIG. 3, according to an embodiment of the present invention.

FIG. 8 is a view for explaining operations of the second PCM encoder 350 of FIG. 3. After 1 bit-shifting is performed on a 1-D block and then a value of each pixel is PCM coded. At this point, a separate field 810 is added before a field 830 arranging a PCM result of each pixel, so that a flag indicating that whether a 1 bit-shifted pixel contained in a 1-D block has only the same value may be assigned to the field 810.

Figure 9:
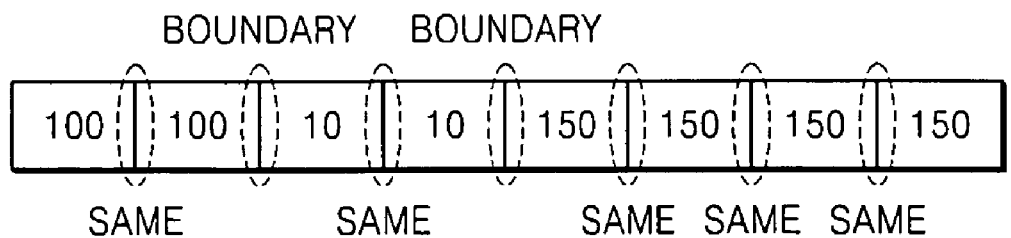
FIG. 9 is a view illustrating an example of a 1-D block determined to be a text image by the text image determination part of FIG. 3.

FIG. 9 is a view illustrating an example of a 1-D block which is determined to be a text image by the text image determination part 370 of FIG. 3. When a second threshold value is set at '80', a third threshold value is set at '4', and a fourth threshold value is set at '4', the 1-D block illustrated in FIG. 9 has two boundary portions where a difference between adjacent pixel values is greater than '80' and five portions where a difference between adjacent pixel values is greater than '4', so that the 1-D block is determined to be a text image.

Figure 10:
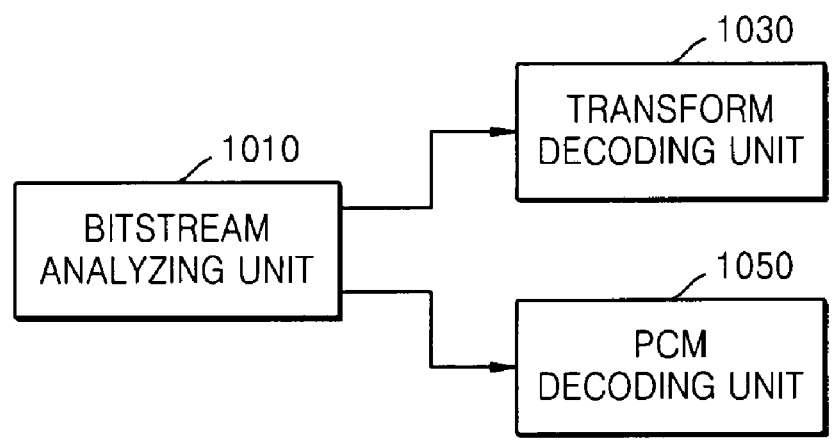
FIG. 10 is a block diagram of an image decoding apparatus according to an embodiment of the present invention.

FIG. 10 is a block diagram of an image decoding apparatus according to an embodiment of the present invention. The image decoding apparatus includes a bitstream analyzing unit 1010, a transform decoding unit 1030, and a PCM decoding unit 1050.

Referring to FIG. 10, the bitstream analyzing unit 1010 analyzes a bitstream provided from the image encoding apparatus, determines whether the bitstream is a bitstream generated as a result of transform coding or a bitstream generated as a result of PCM coding, provides the bitstream generated as a result of the transform coding to the transform decoding unit 1030, and provides the bitstream generated as a result of the PCM coding to the PCM decoding unit 1050. As a non-limiting example, it is possible to check a flag contained in a header of a bitstream, thereby checking an encoding method thereof. Such a flag indicating an encoding method is determined and set in advance between an image encoding apparatus and an image decoding apparatus.

The transform decoding unit 1030, which performs a process opposite to that of the transform encoding unit 230 of FIG. 2, performs transform decoding on a bitstream generated as a result of transform coding to generate a recovered 1-D block.

The PCM decoding unit 1050, which performs a process opposite to that of the PCM encoding unit 250 of FIG. 2, performs PCM decoding on a bitstream generated as a result of PCM coding to generate a recovered 1-D block.

Figure 11:
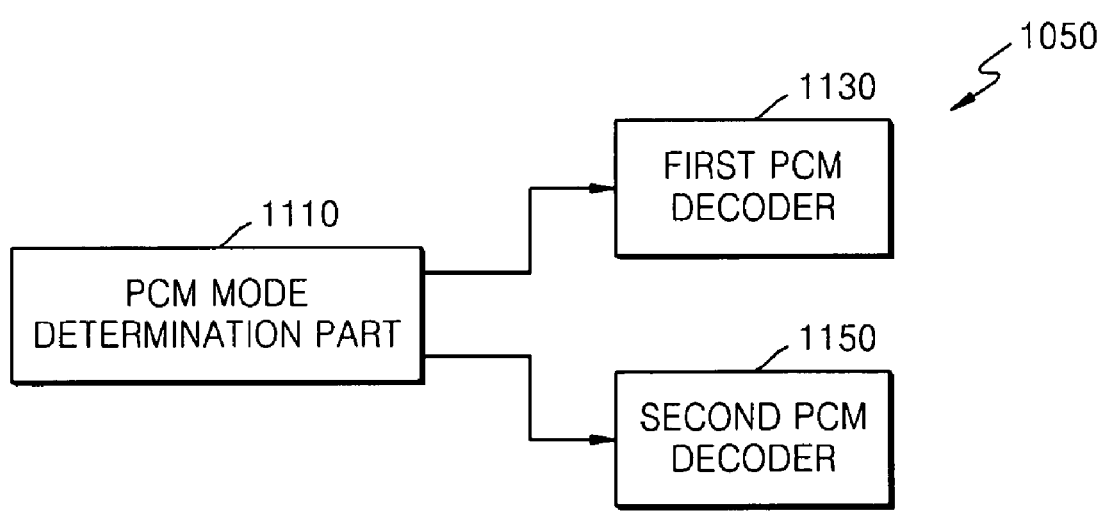
FIG. 11 is a block diagram illustrating details of a PCM decoding unit of FIG. 10, according to an embodiment of the present invention.

FIG. 11 is a block diagram illustrating details of the PCM decoding unit 1050 of FIG. 10. The PCM decoding unit 1050 includes a PCM mode determination part 1110, a first PCM decoder 1130, and a second PCM decoder 1150.

Referring to FIG. 11, the PCM mode determination part 1110 judges whether a bitstream has been generated as a result of binary PCM coding or normal PCM coding. Like the bitstream analyzing unit 1010, the PCM mode determination part 1110 may check a flag contained in a header of a bitstream, thereby checking a PCM mode thereof. Such a flag indicating a PCM mode is determined and set in advance between an image encoding apparatus and an image decoding apparatus.

When a bitstream has been generated by binary PCM coding as a result of the determination by the PCM mode determination part 1110, the first PCM decoder 1130 performs binary PCM decoding so as to correspond to the first PCM encoder 330 of FIG. 3 of the image encoding apparatus.

When a bitstream has been generated by normal PCM coding as a result of the determination by the PCM mode determination part 1110, the second PCM decoder 1150 performs normal PCM decoding so as to correspond to the second PCM encoder 350 of FIG. 3 of the image encoding apparatus.

Figure 1B:
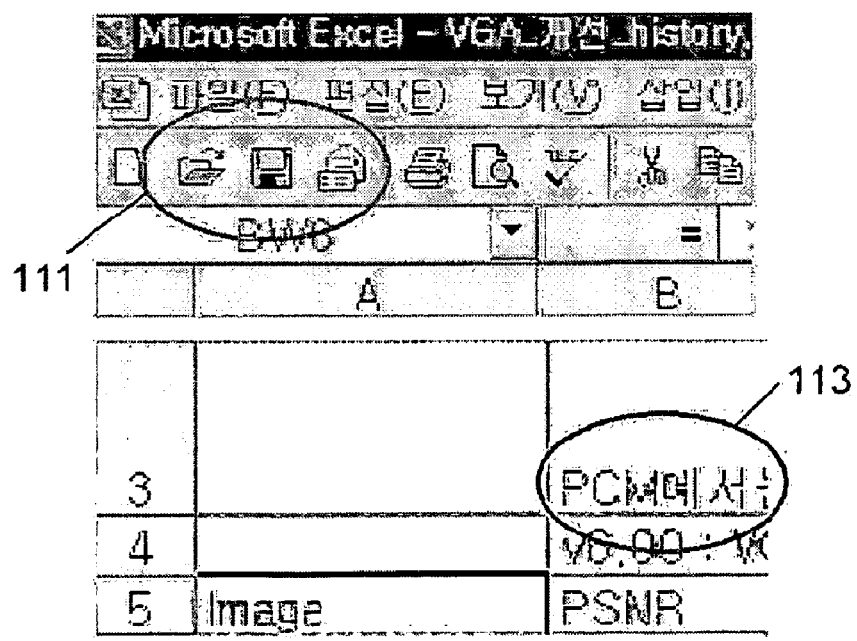
Figure 1C:
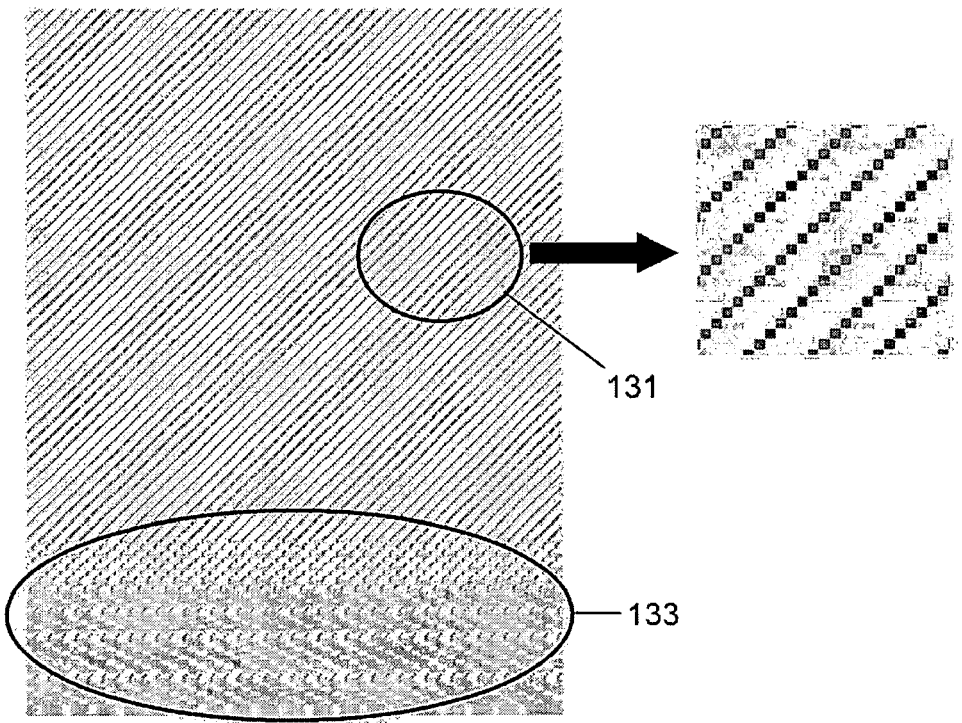
Figure 12A:
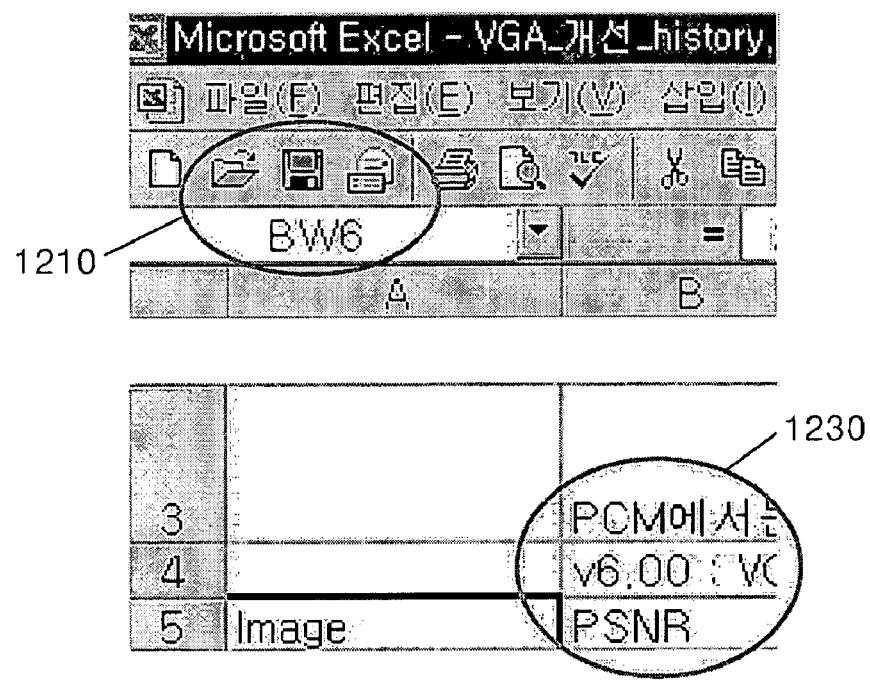
FIGS. 12A and 12B are views illustrating the performance of the image encoding apparatus and method, and the image decoding apparatus and method.
Figure 12B:
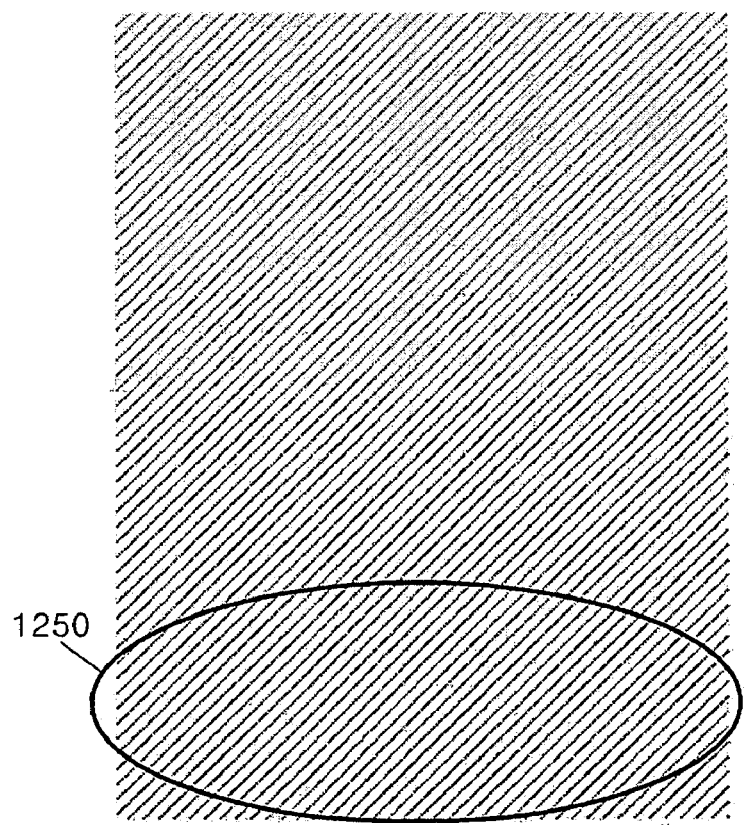

FIGS. 12A and 12B are views illustrating performance of the above-described image encoding apparatus and method and the above-described image decoding apparatus and method. With regard to a peak signal-to-noise ratio, a recovered image (FIG. 1B) of the conventional art has a peak signal-to-noise ratio of 21 dB, but a recovered image (FIG. 12A) of the above-described embodiments has a peak signal-to-noise ratio of 45 dB, which is an improved value. Also, comparison of the recovered image (FIG. 12A) of the above-described embodiments with the recovered image (FIG. 1B) of the conventional art shows that a recovered image quality of portions 1210 and 1230 that correspond to a binary image and a text image of the above-described embodiments is improved. Also, comparison of a recovered image (FIG. 12B) with a recovered image quality (FIG. 1C) of the conventional art, shows that a lower portion 1250 of the recovered image (FIG. 12B) has been properly recovered.

The first through fifth threshold values may be set as optimized values considering image quality of a recovered image, a bit rate, and a data amount generated during coding through an experimental method or a statistical method.

The image encoding apparatus and the image decoding apparatus according to the above-described embodiments of the present invention may be mounted in multimedia apparatuses such as mobile phones or personal digital assistants (PDAs). Also, only the image decoding apparatus may be mounted in multimedia apparatuses.

Embodiments of the invention include computer readable codes on a computer readable recording medium. The computer readable recording medium is any non-transitory data storage device that can store data which can be thereafter read by a computer system. Examples of the non-transitory computer readable recording medium include read-only memory (ROM), random-access memory (RAM), CD-ROMs, magnetic tapes, floppy disks, and optical data storage devices. The computer readable recording medium can also be a distributed network coupled computer systems so that the computer readable code is stored and executed in a distributed fashion.

According to the above-described embodiments of the present invention, it is possible to minimize reduction of image quality of a recovered image by performing both the transform coding and the PCM coding on an image to encode and selecting a bitstream obtained by performing the PCM coding according to a predetermined law when the image to encode is a binary image or a text image containing a boundary portion.

Also, it is possible to prevent an increase of a data amount by performing both the transform coding and the PCM coding on an image to encode and selecting a bitstream obtained by performing the PCM coding according to a predetermined law when a data amount of a bitstream generated by the transform coding is greater than a predetermined amount.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image encoding apparatus comprising:
   an image input unit to receive an image to be encoded;
   a transform encoding unit to transform code the image provided from the image input unit to generate a first bitstream;
   a pulse code modulation (PCM) encoding unit to PCM code the image provided from the image input unit to generate a second bitstream; and
   a selector to select and to output one of the first bitstream and the second bitstream depending on characteristics of the image.

2. The apparatus of claim 1, wherein the image input unit generates one-dimensional (1-D) blocks having a predetermined number of pixels for each line of the image, and provides the image in units of 1-D blocks to the transform encoding unit and to the PCM encoding unit.

3. The apparatus of claim 1, wherein, when the second bitstream outputted from the PCM encoding unit is generated as a result of coding for a binary image or a text image, the selector selects and outputs the second bitstream.

4. The apparatus of claim 1, wherein, when a data amount of the first bitstream is greater than a first threshold value, and the selector selects and outputs the second bitstream.

5. The apparatus of claim 1, wherein the PCM encoding unit comprises:
   a binary image determination part to determine whether each pixel contained in the image has no more than two different values;
   a first PCM encoder to binary PCM encode the image to generate the second bitstream, when each pixel contained in the image has no more than two different values; and
   a second PCM encoder to normally PCM code the image to generate the second bitstream, when each pixel contained in the image has more than two different values.

6. The apparatus of claim 5, wherein the PCM encoding unit further comprises a text image determination part to determine whether the second bitstream corresponds to a text image.

7. The apparatus of claim 5, wherein the binary image determination part comprises a flag setting part to check a value of each pixel contained in the image and to set at least one flag indicating a binary image, when each pixel has no more than two different values.

8. The apparatus of claim 7, wherein the binary image determination part further comprises a bit shifter to bit-shift the value of each pixel contained in the image and to provide the bit-shifted values to the flag setting part.

9. The apparatus of claim 8, wherein the binary image determination part checks the value of each pixel contained in the image and sets the flag when each pixel has two different values and a difference between the two different values is greater than a first threshold value.

10. The apparatus of claim 7, wherein the first PCM encoder binary PCM codes the image to generate the second bitstream containing a binary PCM flag, a PCM coding value of the pixel value contained in the image, and a pixel value pattern.

11. The apparatus of claim 8, wherein the binary image determination part checks a value of each pixel contained in the image and sets a first flag when each pixel has two different values and sets a second flag when each pixel has the same value.

12. The apparatus of claim 11, wherein, when each pixel has the same value, the binary image determination part checks a value of each pixel contained in an image before the bit-shifting and sets the second flag when the values of each pixel are the same.

13. The apparatus of claim 11, wherein the first PCM encoder binary PCM codes the image to generate the second bitstream containing a binary PCM flag, the second flag, a PCM coding value of the pixel value contained in the image, and a pixel value pattern according to the second flag.

14. The apparatus of claim 5, wherein the second PCM encoder bit-shifts the value of each pixel contained in the image to reduce the range of the pixel value and then performs normal PCM coding.

15. The apparatus of claim 6, wherein the text image determination unit determines the second bitstream as a text image when the second bitstream has one or more boundary portions and a similar pixel value or the same pixel value is repeated.

16. The apparatus of claim 6, wherein the text image determination unit determines that the second bitstream is a text image when the second bitstream has a boundary portion where a difference between adjacent pixel values is at least equal to a first threshold value and has a portion of at least a second threshold number of pixels where a difference between adjacent pixel values is not greater than a third threshold value.

17. An image encoding method comprising:
transform coding on an image so as to generate a first bitstream;
pulse code modulation (PCM) coding on the image so as to generate a second bitstream; and
selecting and outputting one of the first bitstream and the second bitstream depending on characteristics of the image.

18. The method of claim 17, wherein the selecting and outputting of one of the first bitstream and the second bitstream comprises selecting and outputting the second bitstream when the second bitstream is generated as a result of coding a binary image or a text image.

19. The method of claim 17, wherein the selecting and outputting of one of the first bitstream and the second bitstream comprises outputting the second bitstream a data amount of the first bitstream is at least equal to a first threshold value.

20. The method of claim 17, wherein the PCM coding comprises:
determining whether each pixel contained in the image has no more than two different values;
binary PCM coding the image to generate the second bitstream when each pixel contained in the image has no more than two different values; and
normally PCM coding each pixel contained in the image to generate the second bitstream when each pixel contained in the image has more than two different values.

21. The method of claim 20, wherein the PCM coding further comprises determining whether the second bitstream corresponds to a text image.

22. The method of claim 20, wherein the determining comprises:
checking a value of each pixel contained in the image; and
setting at least one flag indicating a binary image when each pixel has no more than two different values.

23. The method of claim 20, wherein the determining comprises:
bit-shifting a value of each pixel contained in the image;
checking the value of each pixel contained in the image; and
setting at least one flag indicating a binary image when each pixel has no more than two different values.

24. The method of claim 23, wherein the determining further comprises:
checking a value of each pixel contained in the image; and
setting a flag when each pixel has two different values and a difference between the two different values is greater than a first threshold value.

25. The method of claim 23, wherein the binary PCM coding the image comprises binary PCM coding the image to generate the second bitstream containing a binary PCM flag, a PCM coding value of the pixel value contained in the image, and a pixel value pattern.

26. The method of claim 20, wherein the determining comprises:
checking a value of each pixel contained in the image; and
setting a first flag when each pixel has two different values and setting a second flag when each pixel has the same value.

27. The method of claim 26, wherein the determining further comprises:
checking a value of each pixel contained in an image before bit-shifting when each pixel has the same value; and
setting the second flag when the value of each pixel has the same value.

28. The method of claim 26, wherein the binary PCM coding the image comprises binary PCM coding the image to generate the second bitstream containing a binary PCM flag, the second flag, a PCM coding value of the pixel value contained in the image, and a pixel value pattern according to the second flag.

29. The method of claim 20, wherein the normally PCM coding comprises:
bit-shifting the value of each pixel contained in the image to reduce the range of the pixel value; and
normally PCM coding each bit-shifted pixel.

30. The method of claim 21, wherein the determining comprises determining the second bitstream as a text image when the second bitstream has at least one boundary portion and a similar pixel value or the same pixel value is repeated.

31. An image decoding apparatus comprising:
a bitstream analyzing unit to analyze a bitstream generated by transform coding or pulse code modulation (PCM) coding depending on characteristics of an image to be decoded to determine whether the bitstream has been transform coded or PCM coded;
a transform decoding unit to transform-decode the bitstream when the bitstream is generated by the transform coding; and
a PCM decoding unit to PCM-decode the bitstream when the bitstream is generated by the PCM coding.

32. The apparatus of claim 31, wherein the PCM decoding unit comprises:
a first PCM decoder to binary PCM-decode when the bitstream is generated by binary PCM coding; and
a second PCM decoder to normally PCM-decode when the bitstream is generated by normal PCM coding.

33. An image decoding method comprising:
analyzing a bitstream generated by transform coding or pulse code modulation (PCM) coding depending on characteristics of an image to be decoded to determine whether the bitstream has been transform coded or PCM coded;
transform-decoding the bitstream when the bitstream is generated by the transform coding; and
PCM-decoding the bitstream when the bitstream is generated by the PCM coding.

34. The method of claim 33, wherein the PCM-decoding the bitstream comprises:
binary PCM decoding the bitstream when the bitstream has been binary PCM coded; and
normally PCM decoding the bitstream when the bitstream has been normally PCM coded.

35. A non-transitory computer-readable recording medium having recorded thereon a program for executing the method of claim 17.

36. A non-transitory computer-readable recording medium having recorded thereon a program for executing the method of claim 33.

* * * * *